(12) United States Patent
Schibsbye

(10) Patent No.: US 7,966,726 B2
(45) Date of Patent: Jun. 28, 2011

(54) LEVELLING OF ROOT BUSHINGS ON BLADES FOR WIND TURBINES

(75) Inventor: Karsten Schibsbye, Fredericia (DK)

(73) Assignee: LM Glasfiber A/S, Lunderskov (DK)

( * ) Notice: Subject to any disclaimer, the term of this patent is extended or adjusted under 35 U.S.C. 154(b) by 247 days.

(21) Appl. No.: 12/086,212

(22) PCT Filed: Dec. 28, 2006

(86) PCT No.: PCT/DK2006/000746
§ 371 (c)(1),
(2), (4) Date: Jun. 6, 2008

(87) PCT Pub. No.: WO2007/073735
PCT Pub. Date: Jul. 5, 2007

(65) Prior Publication Data
US 2009/0252614 A1    Oct. 8, 2009

(30) Foreign Application Priority Data

Dec. 28, 2005 (DK) .......................... PA 2005 01841

(51) Int. Cl.
*B21D 53/78* (2006.01)
*B23P 15/02* (2006.01)

(52) U.S. Cl. ........ 29/889.7; 29/23.51; 409/64; 409/131; 415/209.1; 416/61; 416/248

(58) Field of Classification Search ................ 29/889.7, 29/23.51; 290/55; 409/64, 131; 415/209.1; 416/61, 207, 248
See application file for complete search history.

(56) References Cited

U.S. PATENT DOCUMENTS

| | | | | |
|---|---|---|---|---|
| 3,594,099 A | * | 7/1971 | Herbert | 416/207 |
| 4,256,435 A | * | 3/1981 | Eckel | 415/209.1 |
| 4,366,387 A | * | 12/1982 | Carter et al. | 290/55 |
| 4,420,354 A | | 12/1983 | Gougeon et al. | |
| 4,692,097 A | * | 9/1987 | Bibollet | 416/207 |
| 5,327,647 A | * | 7/1994 | Gurniak | 29/889 |
| 5,782,606 A | * | 7/1998 | Mondet et al. | 416/142 |
| 6,106,204 A | * | 8/2000 | Dansereau et al. | 409/183 |
| 6,948,784 B2 | * | 9/2005 | Wodrich et al. | 305/202 |
| 7,147,895 B2 | * | 12/2006 | Cundiff et al. | 427/289 |

FOREIGN PATENT DOCUMENTS

| | | |
|---|---|---|
| AU | 604 190 | 12/1990 |
| EP | 1 486 415 | 12/2004 |
| FR | 2 302 168 | 9/1976 |
| JP | 03-015669 | 1/1991 |
| JP | 08-270540 | 10/1996 |
| JP | 11-182408 | 7/1999 |
| JP | 2003-293935 | 10/2003 |
| WO | WO 2004/110862 | 12/2004 |
| WO | WO 2006/070171 | 7/2006 |

* cited by examiner

*Primary Examiner* — Rick K Chang
(74) *Attorney, Agent, or Firm* — Day Pitney LLP

(57) ABSTRACT

The present invention relates to a method of manufacturing a blade for a wind turbine, wherein the blade is made in one or more moulds; and wherein the blade has integrally moulded root bushings in the root of the blade for direct or indirect attachment to a hub in a wind turbine. The novel aspect of the invention is that the root bushings (203) in the root (201) of the blade are leveled by shortening of at least one of the root bushings prior to the blade being removed from a supporting mould (205). The invention further relates to a blade made in accordance with the method and a leveling unit (207) for leveling the root of the blade, wherein the leveling unit comprises means for mounting on a mould.

5 Claims, 2 Drawing Sheets

LEVELLING OF ROOT BUSHINGS ON BLADES FOR WIND TURBINES

The invention relates to a method of manufacturing a blade for a wind turbine, wherein the blade is made in one or more moulds; and wherein the blade has integrally moulded root bushings in the root of the blade for direct or indirect attachment to a hub in a wind turbine. Moreover, the invention relates to a blade made in accordance with the invention. Finally the method relates to a leveling unit for use in connection with the manufacture of a blade for a wind turbine, wherein the blade is made in one or more moulds; and wherein the blade has integrally moulded root bushings in the root of the blade for direct or indirect attachment to a hub in a wind turbine.

BACKGROUND

In the context of manufacturing blades for wind turbines, the course of manufacture is that laminate blade shells are moulded in moulds and are subsequently assembled to form a complete blade. In connection with the moulding process, a number of root bushings with threads are arranged at the root of the blade for use in connection with mounting on the hub of the wind turbine by means of bolts. In the context of this, it is important that the root bushings terminate in the same root bushing plane and, at the same time, it is important that the plane in which the root bushing plane is situated is the correct plane relative to the blade, since otherwise it may mean that the blade is mounted askew and that the bearing between hub and blade is thereby forced askew. If all the root bushings are not in the same root bushing plane, it may mean that some of the bushings are caused to carry more load than others, thereby considerably deteriorating the longevity of the bearing and hence of the wind turbine.

Albeit tools are known intended for ensuring that the root bushings are plane in connection with the moulding integrally in the root of the blade shells, the shells deform and they shrink in connection with the curing of the laminate material, which means that the root bushings can be caused to be askew. This also means that it is impossible to predict the skewness the root bushings end up with simultaneously with the skewness differing from one blade to another.

Today, the above issue is solved by the root bushings being grinded following finished moulding, and this procedure takes place by the finished blade resting on a support, eg a blade carriage, following discharge from the mould, following which a cylindrical grinding machine is mounted in the root of the blade which grinds the root bushings and thereby shortens some of the root bushings to the effect that they are caused to terminate in the same root bushing plane. The grinding procedure as such takes place by a person monitoring spark formation from the root bushings, and when sparks are generated at all root bushings it is due to the fact that all bushings terminate in a common root bushing plane that corresponds to the grinding plane.

The problem of the above method is that, following discharge from the mould, the blade yields and deforms due to the self-weight of the blade, and therefore the plane grinding relative to the blade is no longer accurate and homogeneous. This means that the root bushing plane may be askew relative to the blade and the desired plane, and moreover the root bushing plane does not become uniformly plane either for blades that are to partake in the same wind turbine. In connection with the leveling of the root bushing plane there is often, in particular when large blades of about 50 m or more are concerned, a very little tolerance in the surface evenness in the order of ±2/10 mm. Moreover a subsequent verification of the root bushing plane is problematic as it is performed in relation to points on the blade.

OBJECT AND DESCRIPTION OF THE INVENTION

It is the object of the invention to provide a solution to the above problem.

The present invention thus relates to a method of manufacturing a blade for a wind turbine, wherein the blade comprises laminate shells made in moulds, wherein the shells are assembled to form a blade following moulding simultaneously with it being supported by the mould of the at least the one shell; and wherein the blade has integrally moulded root bushings in the root of the blade for attachment to a hub in a wind turbine. The root bushings in the root of the blade are leveled by shortening of at least one of the root bushings prior to the blade being removed from the supported mould. Thereby it is ensured that the blade is supported optimally during the leveling procedure since the moulds support the blade evenly over the entire surface. This ensures a more accurate leveling, by which a homogeneous root bushing plane is ensured. Moreover, it also ensures a uniform root bushing plane for different blades, as long as they are moulded in the same mould, the support for different blades being the same when they are moulded in the same mould. When the root bushings are leveled, it is not necessary to provide a root plate and it is therefore possible to handle the blade from the root. Moreover the leveling can be performed simultaneously with the blade curing completely and thereby time is saved in connection with the overall processing process of the blade.

According to one embodiment, the leveling is performed by milling. By this shortening technique less heat is emitted than by grinding, and hence it is possible to carry out the leveling more quickly, as opposed to grinding where it is often to be made very slowly to reduce heating of the root bushings.

According to one embodiment the leveling is performed by a leveling unit mounted on the mould. Thereby the leveling unit is secured on a stable platform, and by allowing the leveling to be performed relative thereto, the risk of imprecise leveling is minimized.

According to one embodiment the leveling unit measures how much the root bushings are to be shortened prior to leveling of the root bushings. By measuring this, the leveling unit will, via a control, be able to determine when the leveling is to be ended and thereby the leveling procedure becomes automated and need not necessarily be monitored.

The invention also relates to a wind turbine comprising a blade made in accordance with the method described above.

According to one embodiment, a verification of the leveling is performed relative to one or more points on the mould. The use of points on the mould as reference points for the leveling verification is advantageous since uniform and static reference points are hereby ensured. This provides uniform and precise leveling.

The invention also relates to a leveling unit for use in connection with the manufacture of a blade for a wind turbine, wherein the blade is a laminate element composed of laminate shells made in moulds, wherein the shells are subsequently assembled to form a blade simultaneously with the latter being supported by the mould of the one shell; and wherein the blade has integrally moulded root bushings in the root for attachment to a hub in a wind turbine. The leveling unit comprises attachment means for attachment onto the mould to the effect that the root bushings in the root of the blade can be leveled by shortening of at least one of the root bushings prior to the blade being removed from the supporting mould. Thereby the leveling unit is secured on a stable platform, and by allowing the leveling to be performed in relation thereto, the risk of imprecise leveling is minimized.

According to one embodiment the leveling unit comprises milling means for shortening the root bushings. This shortening technique emits less heat than grinding and thereby the leveling can be accomplished more expediently since, when grinding is concerned, it is often necessary to do it very slowly to reduce heating of the root bushings.

According to one embodiment the leveling unit comprises measuring units for measuring how much the root bushings are to be shortened. By measuring this, the leveling unit will be able to determine, via a control, when the leveling is to be ended and thereby the leveling procedure becomes automated and need not necessarily be monitored.

According to one embodiment the measuring units are optical meters. Such meters are meters that are able to measure with high precision and thereby they comply with the strict standards that apply in connection with the leveling of the root bushings.

BRIEF DESCRIPTION OF DRAWINGS

In the following the invention will be described with reference to the figures, wherein.

DESCRIPTION OF EMBODIMENTS

Figure 1A:
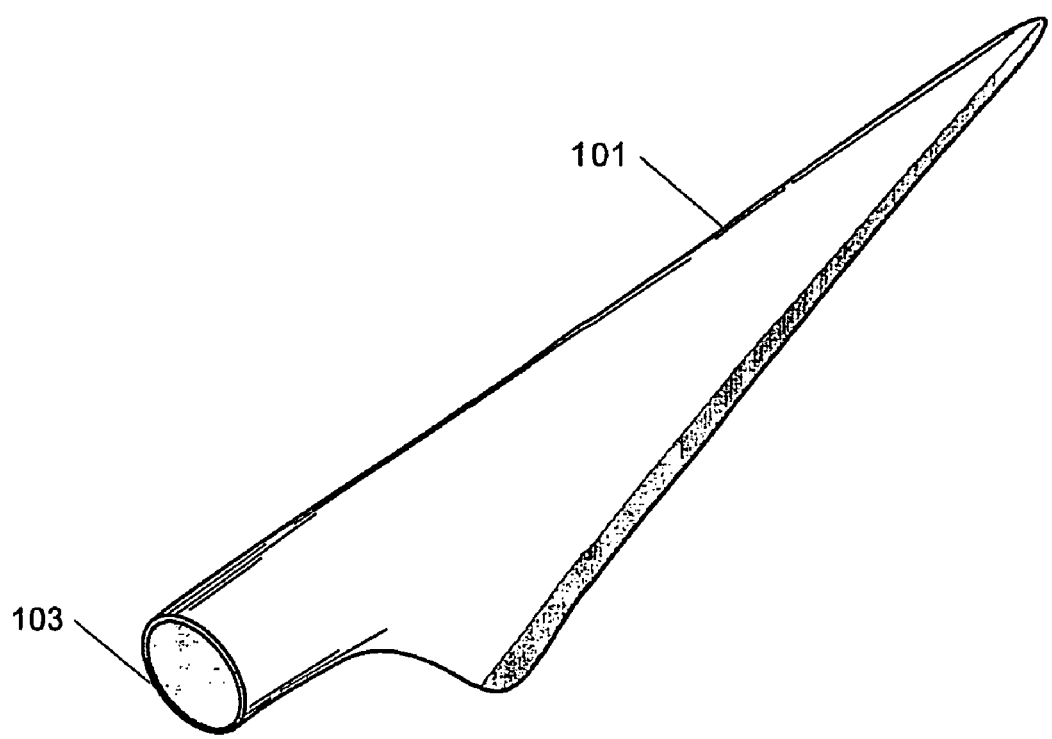
FIG. 1a shows a blade for a wind turbine.
Figure 1B:
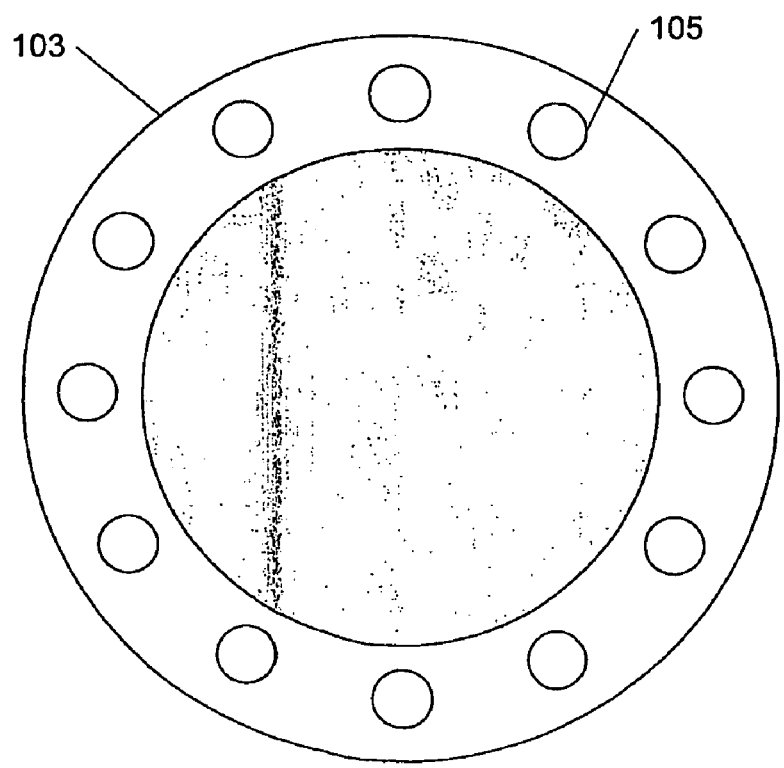
FIG. 1b shows the root, seen from the end of the blade, showing the root bushings.
Figure 2A:
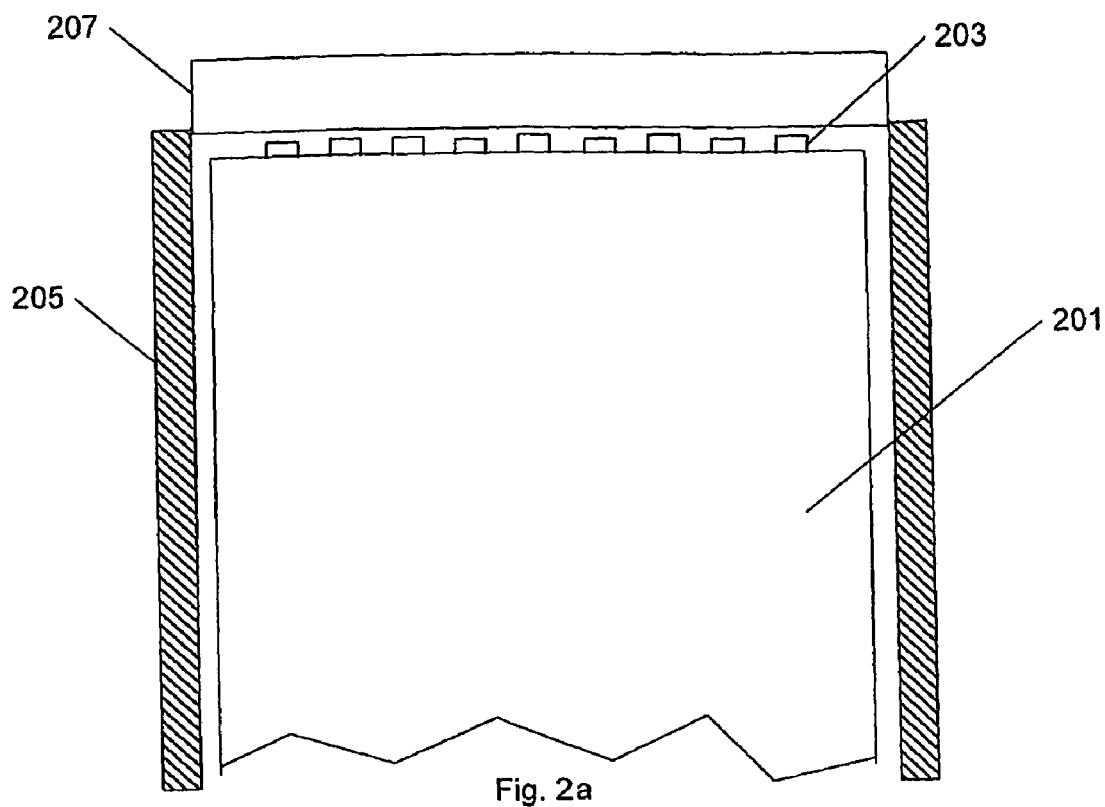
FIG. 2a shows the root of a blade prior to leveling, where the blade is arranged in a mould and wherein a leveling unit is mounted on the mould.

FIG. 1a shows a blade for a wind turbine, wherein the root 103 is indicated. When the blade is to be mounted on the hub of a wind turbine, it is the root 103 that is mounted securely on the hub with contact to same. FIG. 1b shows the root 103 of the blade, seen from the end of the blade. Here the root bushings 105 are illustrated, and these bushings are the ones that are used when the blade is to be secured to the hub. The number of bushings depend on the size of the blade, but may be eg between 60 and 90 bushings. In connection with moulding of the blade shells, the root bushings, which may be of metal, are moulded integrally, evenly distributed along the circular cross section of the root. For instance, the bushings may be provided with threads, and in that case the blade can be secured to the hub by mounting bolts through the hub and into the bushings. FIG. 2a shows the root 201 of a blade, wherein the blade is arranged in a mould 205, and wherein fittings, hinges or the like are used to mount a leveling unit 207 on the mould. The leveling unit 207 serves the purpose of leveling the root bushings 203 in the root of the blade. The leveling unit levels by shorting some or all of the bushings to the effect that they are all caused to terminate in the same plane; the shortening as such may take place eg by grinding or milling. One example of the functionality of the leveling unit could be the following:

1. The blade shells have been joined by gluing and are now supported primarily by the moulds of one of the blade shells. The mould for the other blade could, in one embodiment, remain on the top blade shell during leveling, whereby the mould contributes to securing the shell, it still sitting in the mould. Such securing may contribute to further ensuring support for the blade. Alternatively, the top blade shell could be released from the mould in order to thereby ensure that the blade shells have been caused to mate correctly relative to each other prior to the root bushings being leveled.
2. The leveling unit is secured by securing means to the supporting mould.
3. The leveling unit identifies the root bushing that protrudes furthest from the root and the root bushing that protrudes least from the root, and, based on that, it is determined how much the other root bushings are to be shortened, and that all the root bushing ends are plane. This identification procedure may take place eg by use of optical distance meters mounted on the leveling unit, but other types of distance meters could also be used.
4. The leveling unit starts its leveling at the root bushing that protrudes furthest from the root and shortens the root bushings until all the root bushing ends are in the same plane. The shortening as such may, according to one embodiment, take place by the root bushing ends being shortened by milling or grinding.
5. Following shortening of the root bushing ends such that all the root bushing ends terminate in the same root bushing plane, the leveling unit stops, and the leveling procedure is finished. In a further step, it is conceivable, however, that the leveling unit uses the optical distance meters to verify that the leveling is as desired. This verification could be performed eg in relation to points on the mould.

Figure 2B:
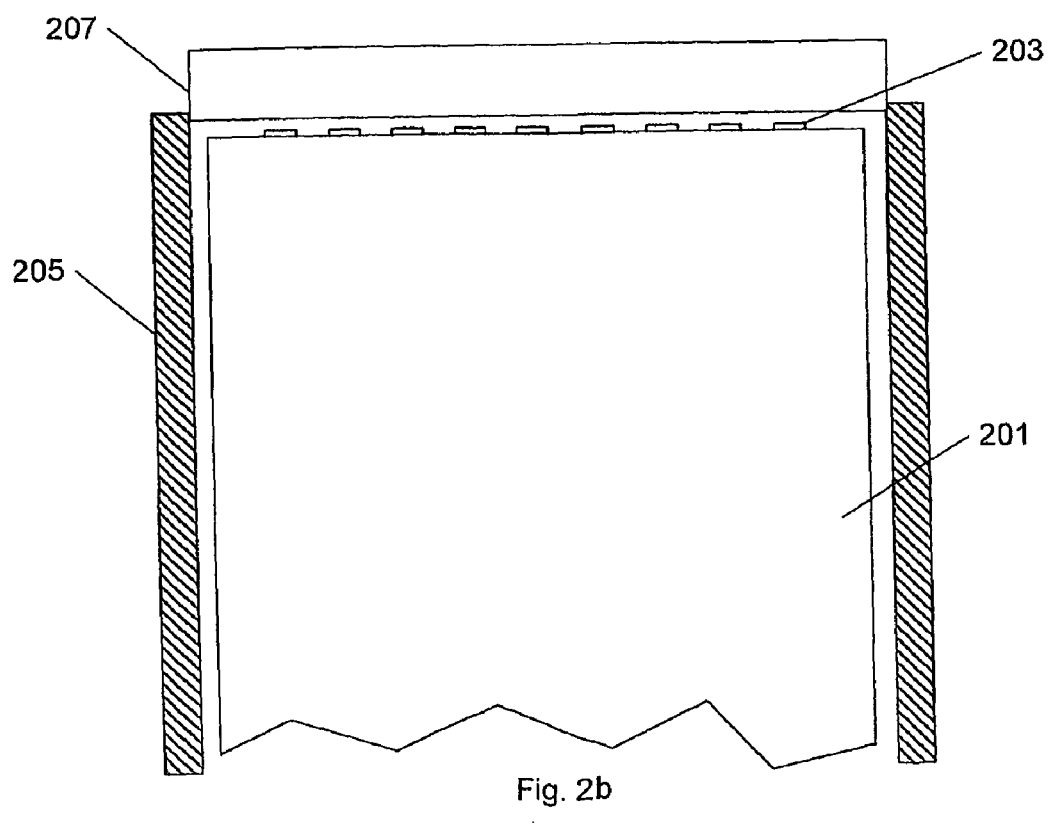
FIG. 2b shows the root of a blade prior to leveling.

FIG. 2b shows the root 201 of the blade supported by the mould 205 following ended leveling by the leveling unit 207 of the root bushings 203. The blade is now discharged from the mould and taken on for further processing.

It will be understood that the invention as taught in the present specification and figures can be modified or changed while continuing to be comprised by the protective scope conferred by the following claims.

The invention claimed is:

1. A method of manufacturing a blade for a wind turbine, wherein the blade is made in one or more moulds (205), and wherein the blade has integrally moulded root bushings (105) in a root (103) of the blade for direct or indirect attachment to a hub in the wind turbine, comprising the root bushings (105) in the root (103) of the blade are levelled by shortening of at least one of the root bushings (105) prior to the blade being removed from a supporting mould (205) of said one or more moulds (205).

2. The method according to claim 1, comprising the levelling is performed by a cutting process comprising milling.

3. The method according to claim 1, comprising the levelling is performed by a levelling unit (207) mounted on the moulds (205).

4. The method according to claim 3, comprising the levelling unit (207) measures how much the root bushings (105) are to be shortened before the root bushings (105) are levelled.

5. The method according to claim 1, comprising a verification of the levelling is performed relative to one or more points on the moulds (205).

* * * * *